May 12, 1970   H. V. HANSEN ETAL   3,511,522
HITCH DEVICE FOR INTERCONNECTING TWO IMPLEMENTS TO A TRACTOR
Filed Feb. 23, 1968   4 Sheets-Sheet 1
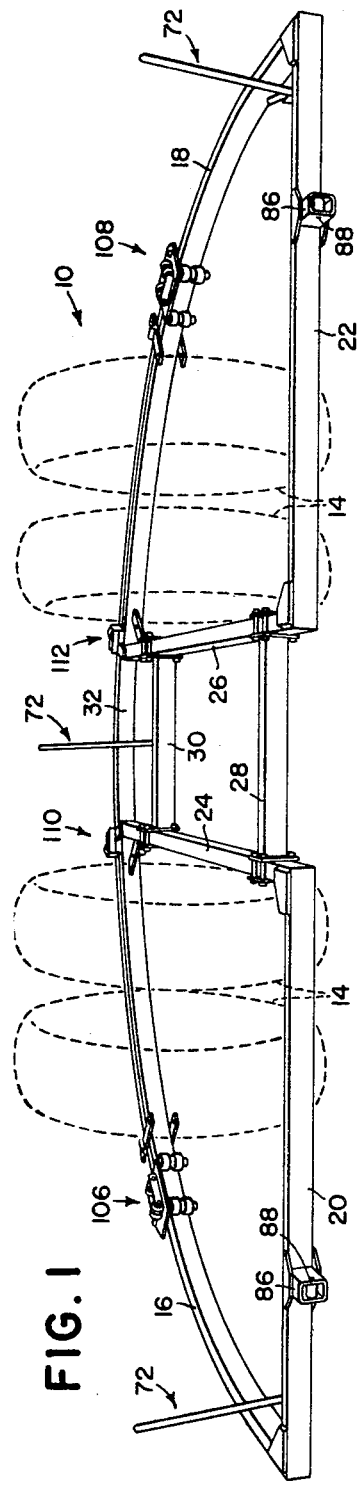
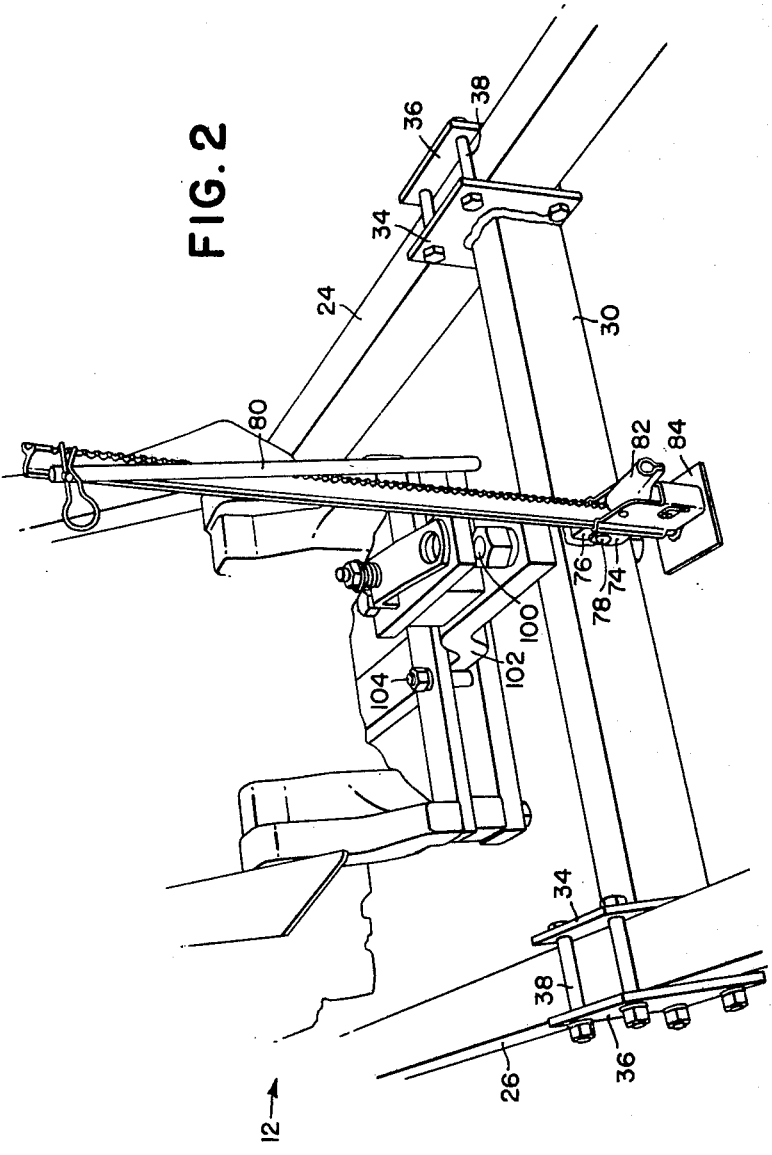
INVENTORS.
HAROLD V. HANSEN
CHARLES H. YOUNGBERG
PERRY FORD, JR.
BY
ATTORNEY

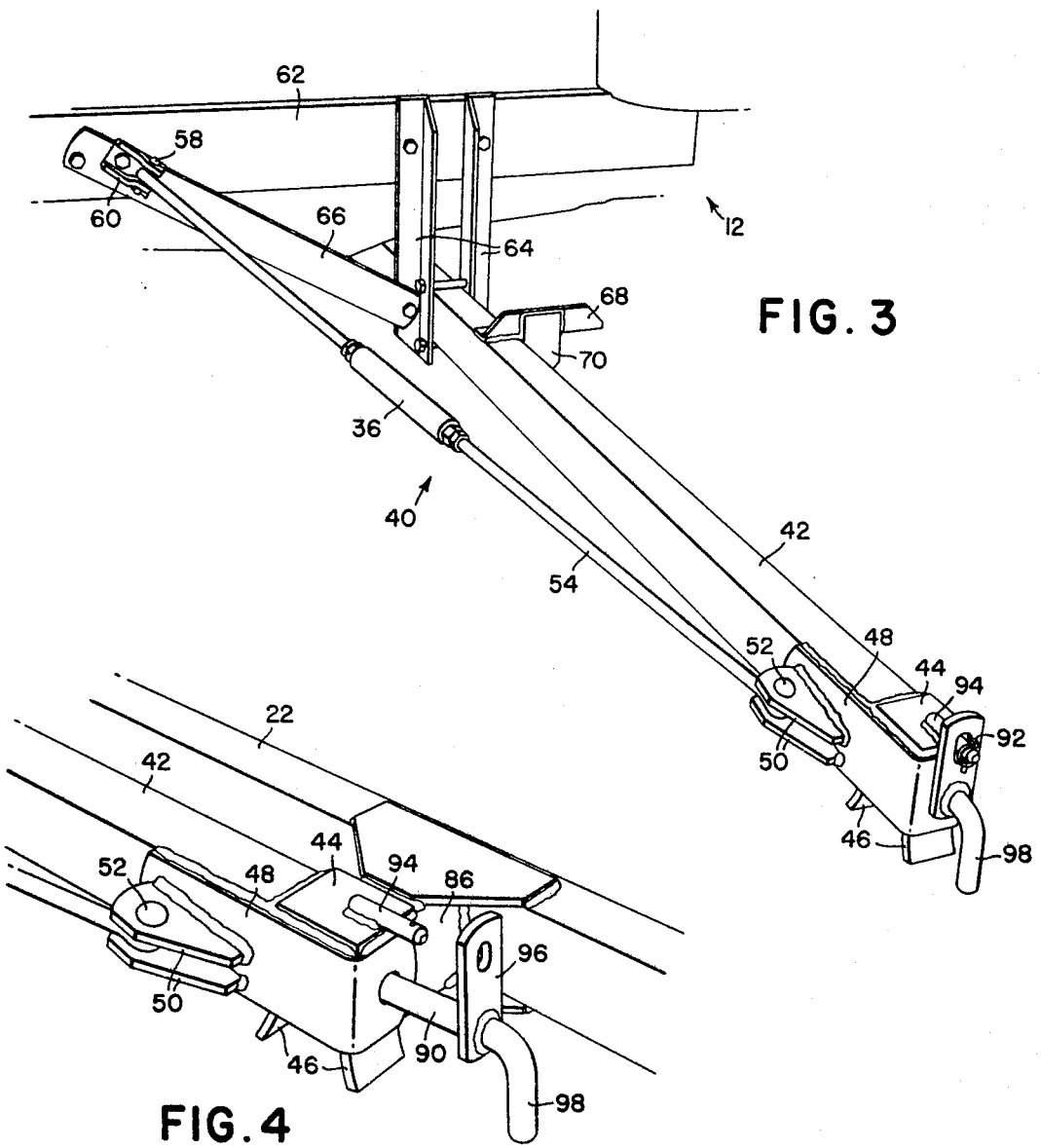

INVENTORS.
HAROLD V. HANSEN
CHARLES H. YOUNGBERG
PERRY FORD, JR.
BY
ATTORNEY

United States Patent Office 3,511,522
Patented May 12, 1970

3,511,522
HITCH DEVICE FOR INTERCONNECTING TWO IMPLEMENTS TO A TRACTOR
Harold Valentine Hansen, Cordova, Charles Harold Youngberg, Moline, and Perry Ford, Jr., Rock Island, Ill., assignors to Deere & Company, Moline, Ill., a corporation of Delaware
Filed Feb. 23, 1968, Ser. No. 707,695
Int. Cl. B60d 1/00
U.S. Cl. 280—412
9 Claims

ABSTRACT OF THE DISCLOSURE

A hitch having a generally D-shaped frame securable to a tractor with the D encircling the tractor rear wheels. An arcuate frame member is supported by the arcuate portion of the D-frame for lateral movement relative to the tractor. Spaced apart hitch points are provided on the shiftable arcuate frame member to which implements may be secured.

FIELD OF THE INVENTION

This invention relates generally to agricultural equipment, and more particularly to hitch devices for securing two implements to a tractor. More particularly it is a feature of this invention to provide a hitch having a semicircular frame section to which a shiftable arcuate frame member may be secured for lateral shifting movement, the arcuate frame member having spaced apart hitch points to which implements may be secured.

CROSS REFERENCE TO RELATED APPLICATIONS

This application discloses and claims a hitch device shown schematically in copending application Ser. No. 719,563 filed Apr. 8, 1968.

DESCRIPTION OF THE PRIOR ART

Hitch devices of the type shown in U.S. Pat. No. 3,079,174 to Oehler et al. have been used for securing a pair of implements to a tractor. With this form of implement hitch, less headlands are needed at the end of a field for turning, and also, the operator of the tractor has better control of the implements. The Oehler et al. implement has certain disadvantages, particularly when used with implements of a width greater than twelve feet, and also, when used with tractors having dual drive wheels. The commercial form of the Oehler et al. hitch cannot be used with these larger implements or with tractors having dual wheels, and it has not been practical to simply increase the dimensions of the Oehler hitch. Some of the difficulties encountered when making the Oehler hitch larger are that it is extremely difficult to transport the Oehler hitch when the side-to-side dimensions are in excess of twelve feet due to the large size of the single arcuate frame section. Also, it has been found that it is quite difficult to mount a hitch of this type when its transverse dimension exceeds twelve feet. It has also been found that when rolling the curved sections that it is difficult to maintain the desired degree of curvature when larger sections are rolled, and this will cause binding of the shiftable arcuate section onto the other fixed arcuate section. It has also been found that it is difficult to mount a hitch of the Oehler type construction on tractors of makes or sizes different than that for which it was designed.

SUMMARY OF THE INVENTION

It is an object of the present invention to provide an implement hitch for securing two implements to a tractor which will overcome the disadvantages of the prior art.

More particularly, it is an object of the present invention to provide an implement hitch to which relatively large implements may be secured, the implement hitch being capable of disassembly for easy transport.

Another object of the present invention is to provide an implement hitch for interconnecting two implements to a tractor which may readily be assembled or disassembled to a tractor.

A still further object of the present invention is to provide an implement hitch for securing the two implements to a tractor which may be readily secured to tractors of varying sizes and makes.

A still further object of the present invention is to provide an implement hitch having a laterally shiftable arcuate member having spaced apart hitch points, the arcuate member in turn being secured to an arcuate section of the hitch frame in such a manner that the arcuate member will not bind to the arcuate section.

These and other objects and advantages of this invention will be apparent to those skilled in the art after a consideration of the following detailed description, taken in conjunction with the accompanying drawings in which the preferred form of this invention is illustrated.

BRIEF DESCRIPTION OF THE DRAWINGS

FIG. 1 is a perspective view of the hitch device of this invention, the tractor dual wheels being shown in phantom.

FIG. 2 is a perspective view of a portion of the rear end of the implement hitch showing the manner in which it is secured to a tractor.

FIG. 3 is a perspective view of a transverse attaching member to which the implement hitch of this invention is secured, the attaching member being secured in turn to the belly of a tractor.

FIG. 4 is a perspective view of a portion of the hitch of this invention secured to the transverse attaching member shown in FIG. 3.

DESCRIPTION OF THE PREFERRED EMBODIMENT

Figure 5:
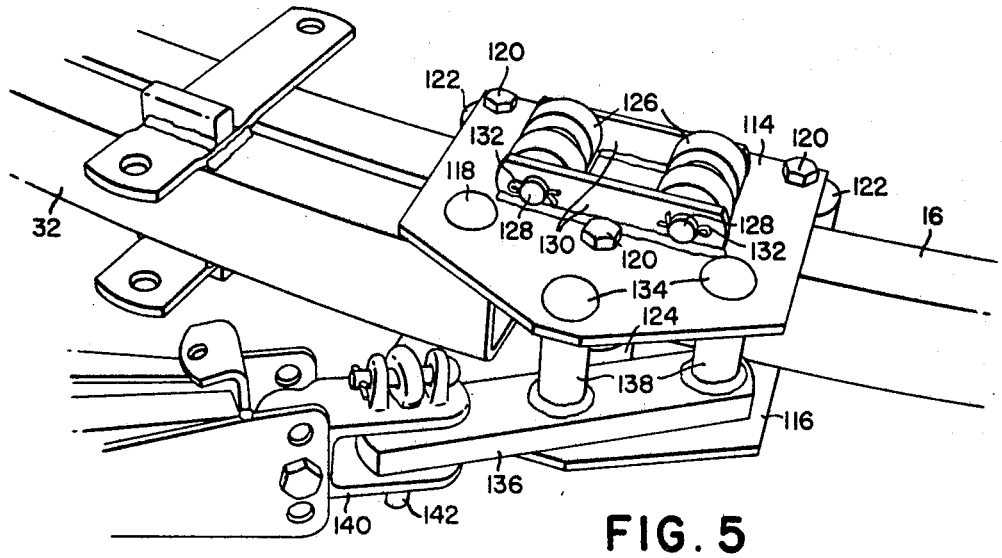
FIG. 5 is a perspective view of an arcuate section of the hitch showing the manner in which the laterally shiftable arcuate member is supported on the arcuate section, there being an implement in turn secured to the hitch point of the shiftable arcuate member.

The hitch device of this invention, which is indicated generally at 10, is adapted to be secured to a tractor, indicated generally at 12, having a pair of spaced apart dual wheels 14.

The hitch device 10 is formed from right and left arcuate sections 16, 18, respectively, forward right and left transverse sections 20, 22, respectively, and right and left longitudinally extending frame sections 24, 26. The right members 16, 20 and 24 are welded to each other to form a right pie section, and the left members 18, 22, and 26 are welded to each other to form a left pie section. The sections 20 and 22 are welded at right angles to the sections 24 and 26, respectively. Each of the two pie sections 16, 20, 24 and 18, 22, 26 are identical to each other and may be used interchangeably. The pie sections are secured to each other by front and rear intermediate sections or ties 28, 30 respectively. An arcuate frame member 32 is carried by the arcuate sections 16 and 18 for lateral shifting movement in a manner which will be more fully described below. The right and left pies are secured to each other by the ties 28, 30 so that the longitudinal members 24, 26 are parallel to each other and also in such a manner that the front transverse sections 20, 22 are in alignment with each other. To facilitate securement, each end of the ties 28, 30 is provided with a vertically disposed end plate 34 (FIG. 2) which is apertured at its corners, the end plate being adapted to cooperate with another plate 36 in such a manner that conventional fasteners 38 may be employed to secure the ties 28, 30 to the longitudinally extending frame members 24, 26. The members 28, 30 may be adjustably positioned on the longitudinally extending frame members 24, 26 to facilitate securement to tractors of varying sizes and makes.

It should be noted from FIG. 1 that the implement hitch 10 is designed to be used with a tractor having dual wheels, each set of dual wheels being positioned within one of the pie sections. Thus, it is necessary when assembling the hitch to the tractor to drive the tractor over the hitch to position the wheels 14 within the desired sections.

To facilitate attaching the hitch to the tractor, a transversely extending attaching member, indicated generally at 40 in FIG. 3, is provided. The attaching member includes a transversely extending tubular beam 42 which carries at each of its ends a generally U-shaped member 44 having downwardly extending and outwardly flared legs 46. An L-shaped bracing member 58 is secured to the end of the transversely extending tubular beam 42 and to the front and outer sides of the U-shaped member 44. Welded to the forward end of the L-shaped member 48 are a pair of spaced apart apertured lugs 50 through which a pin 52 may be disposed to secure the outer end of the transversely extending tubular beam 42 to a truss 54 having a turnbuckle 56. The other end of the truss 54 is secured by means of a pin 58 to a bracket 60 having spaced apart apertured sides, the brackets in turn being bolted to the side frame 62 of a tractor. An intermediate portion of the tubular beam 42 is secured to the side frame of the tractor by front and rear angle irons 64 which are bolted about the beam 42 and in turn bolted to the side frame 62. A brace 66 is bolted to the side frame 62 forward of the angle irons 64, the rear end of the brace 66 is in turn bolted to the forward angle iron 4. Welded to the top of the transversely extending tubular beam 42 is a stop 68 having a depending spacer 70 carried thereby.

After the tractor has been driven into the hitch in the manner indicated in FIG. 1, it is necessary to raise the hitch to secure it to the tractor. Towards this end jacks, indicated generally at 72 in FIG. 1, are provided, there being one jack for each of the front corners of the hitch, and another jack for the rear of the hitch. The jacks are of the well-known bumper jack design and each is provided with apertured ears 74 (only one of which is shown in FIG. 2) securable to an apertured lug 76 welded to one of the frame sections by means of a pin 78. To raise the hitch, the handle 80 of the jack is inserted into the reciprocal barrel 82 and the ground-engaging stand 84 is forced downwardly to cause the hitch 10 to be raised.

Each of the transverse frame sections 20, 22 is provided with a forwardly projecting box beam member 86 (FIG. 1) which is apertured as at 88 to receive a tapered pin 90 (FIG. 4). As the jacks 72 are operated to raise the hitch, the transverse sections 20, 22 will engage the spacer 70 to properly position the sections 20, 22 rearwardly from the beam 42. At the same time, the box beam 86 will contact the outwardly flared legs 46 to cause the hitch to become transversely aligned with the tubular beam 42. The tapered pin is then inserted within the aperture 88 of the box beam 86 and is secured thereto by means of a quick-latch pin 92 (FIG. 3) which passes through a transversely extending pin 94 on the top of the U-shaped member 44, the pin 94 in turn being disposed within an aperture of plate 96 welded on pin 90, the quick-latch pin 92 preventing outward movement of the pin 90. The pin 90 is provided with a handle portion 98.

While the front jacks 72 are necessary to raise the implement hitch, the rear jack 72 may be eliminated and a chain may be used to raise the rear end of the implement hitch, the chain being passed around the tie 30 and the vertically movable hitch of the tractor.

The rear end of the implement hitch 10 is secured to the tractor by means of a bolt and nut 100 (FIG. 2) which pass through the aperture in the drawbar 102 and a corresponding aperture in the tie 30. The drawbar 102 is pinned from transverse movement by fasteners 104 as is conventional.

The second arcuate member 32 is supported to the first arcuate section means 16, 18 by means of right and left track followers 106, 108 and intermediate right and left roller supports 110, 112. As can best be seen in FIG. 5, each track follower has upper and lower spaced apart plates 114, 116 which are secured to each other and to the outer end of the second arcuate section 32 by means of a vertically disposed bolt 118. Vertically disposed pivot bolts 120 which pass through the plates 114, 116 carry inner and outer rollers 122, 124, respectively. Upper rollers 126 and lower rollers (not shown) are rotatably disposed about horizontal pins 128, the pins in turn being held within apertured bars 130 welded to the upper and lower surfaces of plates 114, 116 by means of cotter pins 132. The rollers 126 bear against the upper surface of the arcuate section 16 through an opening (not shown) in the upper plate 114, the lower rollers (not shown) bearing against the under surface of the section 16 and the side rollers, as noted before, bearing against the inner and outer surfaces of the section 16.

The plates 114, 116 are provided with outwardly extending apertured portions through which fasteners 134 are disposed, the fasteners holding a hitch bar 136. Spacers 138 are carried by the hitch bar and are disposed about the pins 134 to hold the hitch bar 136 in either the lower position, shown in FIG. 5, or in an upper position. The rear end of the hitch bar 136 is apertured so that an implement clevis 140 may be secured thereto by means of a clevis pin 142.

Figure 6:
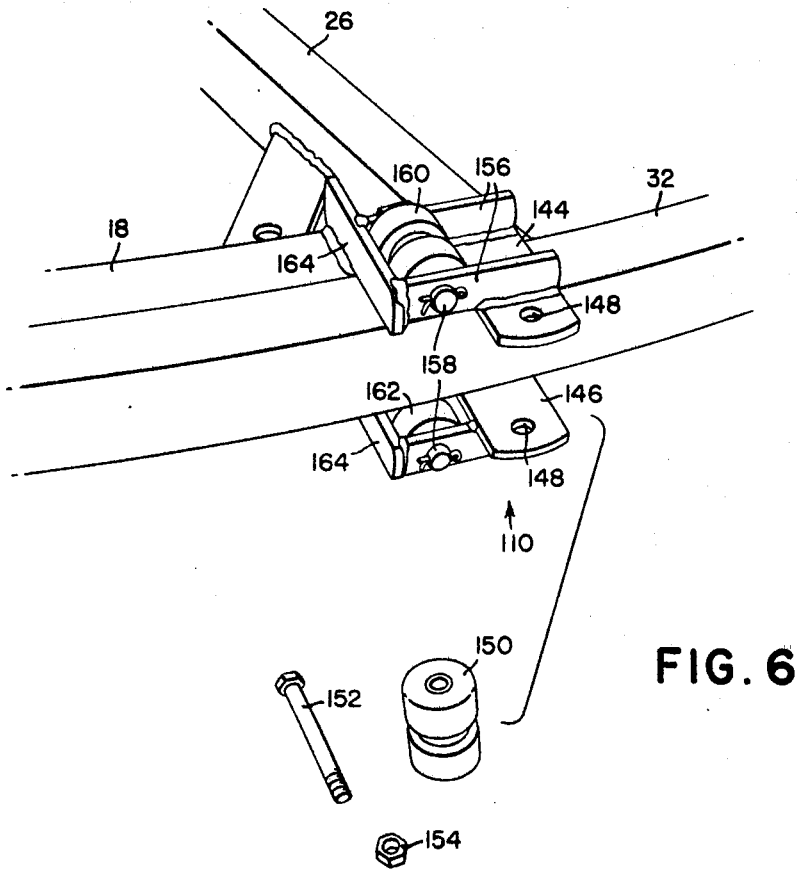
FIG. 6 is a perspective view showing how a mid-portion of the shiftable arcuate member is supported on the hitch.

The roller supports 110 are best shown in FIG. 6 and are formed from upper and lower straps 144, 146 which are welded at their forward ends to the longitudinally extending frame sections 24, 26, the rear ends of the straps being apertured as at 148. A roller 150 is secured to the straps 144, 146 by means of a vertically extending pivot bolt 152 which passes through the apertures 148 and a corresponding aperture in the roller 150, the bolt being secured in place by a nut 154. Welded to the upper and lower straps 144, 146 are generally transversely extending bars 156 which are apertured on their outer ends to receive a pivot pin 158 which supports upper and lower rollers 160, 162, respectively. An outer brace member 164 is secured to each pair of upper and lower bars 156 and is in turn welded to the inner end of one of the first arcuate sections 16, 18. As the second arcuate section 32 shifts laterally with respect to the first sections 16, 18, the rollers 150, 160, 162 will bear against the outer upper and lower surfaces of the section 32.

Figure 7:
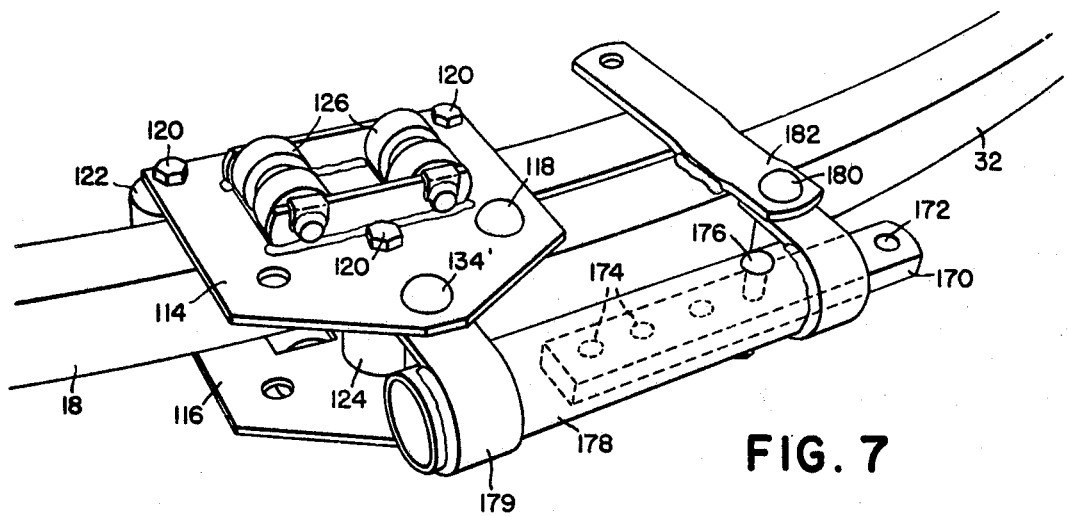
FIG. 7 shows a modified construction of the hitch point shown in FIG. 5.

FIG. 7 shows a slightly modified form of hitch bar for the implements, the hitch bar 170 being provided with a rear aperture 172 to which the implements may be secured, the forward portion of the hitch bar being provided with a plurality of apertures 174 through which a pin 176 may be disposed, the pin in turn passing through aligned apertures in a tubular member 178. The pin 134' passes through apertures in the upper and lower plates 114, 116 and a bail 179 welded on the forward end of the member 178. A rear portion of the tube 178 is secured to the arcuate member 32 by means of a pin 180 which passes through upper and lower apertured lugs 182 welded to the arcuate member 32.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

We claim:

1. An implement hitch for interconnecting two implements to a tractor having spaced apart rear drive wheel means comprising: a frame including first arcuate section means and transverse section means forward of said first arcuate section means, a member comprising a second arcuate section concentric with respect to said first arcuate section means, means shiftably supporting said second arcuate section on said first arcuate section means for generally lateral movement relative thereto, means for securing the first arcuate section means to the tractor so that the arcuate section means encircles the rear and the sides of the tractor drive wheel means, said securing means including a transverse attaching member rigidly secured to said tractor and extending underneath the tractor forward of the rear drive wheel means, said transverse attaching member being provided with means disposed outwardly of the sides of the tractor for interconnecting the transverse section means to the transverse attaching member, and means interconnecting a rear portion of the tractor with said frame.

2. The implement hitch set forth in claim 1 further characterized by jacks secured to the frame outwardly of the wheel means and to the rear of the tractor between the rear wheel means.

3. The implement hitch set forth in claim 1 in which the means for interconnecting the transverse section means with the transverse attaching member includes a pair of forwardly extending transversely apertured lug means on said transverse section means, and a pair of outwardly slidable pin means carried by said transverse attaching member and disposable through said transverse apertures.

4. The implement hitch set forth in claim 1 in which said first arcuate section means and said transverse section means each includes two spaced apart sections, said frame also including a pair of longitudinally extending frame sections each interconnecting one end of one of the first arcuate sections with one end of one of the transverse sections, said longitudinal frame sections being interconnected by a pair of intermediate sections parallel to the transverse sections.

5. The implement hitch set forth in claim 4 in which the means interconnecting a rear portion of the tractor with the frame consists of a bolt disposable through the drawbar of the tractor and one of the intermediate sections.

6. An implement hitch for interconnecting two implements to a tractor having spaced apart rear drive wheel means and a drawbar comprising: a frame including a pair of spaced apart first arcuate sections, a pair of spaced apart transverse sections forward of the first arcuate sections, one end of each of said transverse sections being secured to one end of one of the first arcuate sections, a pair of longitudinally extending frame sections one end of each being secured to the other end of one of the transverse sections, and the other end of the longitudinally extending frame sections being secured to the other end of the first arcuate section, and a pair of intermediate sections detachably securable to the longitudinally extending frame sections for holding the longitudinally extending frame sections in parallel spaced apart relationship, said intermediate sections extending parallel to the transverse section; means for securing the frame to the tractor so that the first arcuate sections encircle the rear and sides of the tractor drive wheel means; a second arcuate section concentric with respect to said pair of first arcuate sections; and means shiftably supporting said second arcuate section on said pair of first arcuate sections for generally lateral movement relative thereto.

7. The implement hitch set forth in claim 6 further characterized by the provision of vertically movable means carried by said frame and engageable with the ground, said vertically movable means being operable to raise and lower the hitch to facilitate attachment to the tractor.

8. The implement hitch set forth in claim 6 in which said securing means includes a transverse attaching member rigidly secured to said tractor and extending underneath the tractor forward of the rear drive wheel means, said transverse attaching member being provided with means disposed outwardly of the sides of the tractor for interconnecting the transverse section means to the transverse attaching member, and means interconnecting a rear portion of the tractor with said frame.

9. An implement hitch for interconnecting two implements to a tractor having spaced apart rear drive wheel means comprising: a frame including a pair of transversely spaced first arcuate section means having inner longitudinal sides spaced transversely from one another and on opposite sides of the tractor, a removable section rigidly but detachably connected to the inner sides and attached to the tractor so that the arcuate section means encircles the rear and sides of the tractor drive wheel means, and a member comprising a second arcuate section concentric with respect to said first arcuate section means, and means shiftably supporting said second arcuate section on each of said first arcuate section means for generally lateral movement relative thereto, said last mentioned means including a track follower at each end of the second arcuate section, said track follower carrying opposed rollers engageable with the top, bottom, inner and outer sides of said first arcuate section means, said first arcuate section means carrying rollers engageable with the top, bottom and rear sides of said second arcuate section, said last mentioned rollers being disposed between said track followers.

References Cited

UNITED STATES PATENTS

| 1,811,072 | 6/1931 | Altgelt | 280—496 |
| 2,393,016 | 1/1946 | Black | 280—477 |
| 2,777,377 | 1/1957 | Johnson et al. | 172—273 |
| 3,079,174 | 2/1963 | Oehler et al. | 280—412 |

FOREIGN PATENTS 607,695 11/1960 Canada.

BENJAMIN HERSH, Primary Examiner

M. L. SMITH, Assistant Examiner

U.S. Cl. X.R.

280—447, 496; 172—272